US012173850B2

(12) United States Patent
Nakashima et al.

(10) Patent No.: US 12,173,850 B2
(45) Date of Patent: Dec. 24, 2024

(54) FLUID TANK

(71) Applicant: TOYOTA JIDOSHA KABUSHIKI KAISHA, Toyota (JP)

(72) Inventors: Tomoki Nakashima, Nagoya (JP); Osamu Sawai, Okazaki (JP); Koji Sugiura, Toyota (JP); Chiaki Kataoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 18/134,665

(22) Filed: Apr. 14, 2023

(65) Prior Publication Data

US 2023/0408041 A1 Dec. 21, 2023

(30) Foreign Application Priority Data

May 27, 2022 (JP) ................................. 2022-086802

(51) Int. Cl.
*F17C 13/08* (2006.01)

(52) U.S. Cl.
CPC .... *F17C 13/084* (2013.01); *F17C 2201/0109* (2013.01); *F17C 2203/012* (2013.01); *F17C 2203/0333* (2013.01); *F17C 2203/0604* (2013.01); *F17C 2203/0629* (2013.01); *F17C 2203/0636* (2013.01); *F17C 2203/066* (2013.01); *F17C 2205/0111* (2013.01); *F17C 2205/0165* (2013.01); *F17C 2221/012* (2013.01); *F17C 2270/0178* (2013.01); *F17C 2270/0184* (2013.01)

(58) Field of Classification Search
CPC ........ F17C 2203/012; F17C 2205/0103; F17C 2205/0111; F17C 2205/0115; F17C 2205/0165
USPC ........................................ 220/592, 584, 581
See application file for complete search history.

(56) References Cited

U.S. PATENT DOCUMENTS

| | | | | |
|---|---|---|---|---|
| 2,372,800 A * | 4/1945 | Stearns | F17C 1/08 | 220/8 |
| 5,758,796 A * | 6/1998 | Nishimura | F17C 1/06 | 220/651 |
| 2019/0226641 A1* | 7/2019 | Ogiwara | F17C 13/12 | |

FOREIGN PATENT DOCUMENTS

| | | | |
|---|---|---|---|
| DE | 20102209 * | 7/2002 | |
| JP | 2020-085137 A | 6/2020 | |
| WO | WO-2015073849 A1 * | 5/2015 | B65D 25/2802 |

* cited by examiner

*Primary Examiner* — Rafael A Ortiz
(74) *Attorney, Agent, or Firm* — Dinsmore & Shohl LLP

(57) ABSTRACT

The pressure vessel contains a fluid, such as a high pressure gas, therein. The metal dome and the metal dome are arranged in the longitudinal direction of the pressure vessel opposite each other with the pressure vessel interposed therebetween. The stay connects the metal dome and the metal dome. The stay is connected to the metal dome and the metal dome such that the distance between the metal dome and the metal dome can be varied.

9 Claims, 12 Drawing Sheets

FLUID TANK

CROSS-REFERENCE TO RELATED APPLICATION

This application claims priority to Japanese Patent Application No. 2022-086802 filed on May 27, 2022, incorporated herein by reference in its entirety.

BACKGROUND

1. Technical Field

The present disclosure relates to a fluid tank.

2. Description of Related Art

A thermally-activated pressure relief device (TPRD) is known as a safety device for a high-pressure tank. A thermally-activated safety valve releases the gas in a high-pressure tank into the atmosphere when the temperature rises due to heat caused by a fire or the like. As a related art, Japanese Unexamined Patent Application Publication No. 2020-85137 (JP 2020-85137 A) discloses a high-pressure tank including a thermally-activated safety valve. The high-pressure tank described in JP 2020-85137 A includes a heat insulating layer formed on an outer surface of a tank main body and a heat transfer layer formed on an outer surface of the heat insulating layer. In the high-pressure tank described in JP 2020-85137 A, the heat-activated safety valve is disposed in the vicinity of the heat transfer layer. The heat transfer layer propagates the heat emitted from the heat source to the thermally-activated safety valve in the event of a fire or the like. In this way, when a fire or the like occurs, the heat-activated safety valve can be quickly operated while suppressing the propagation of heat to the inside of the tank by the heat insulating layer.

SUMMARY

Hydrogen energy has been used primarily in industrial and mobility areas. For example, when a hydrogen tank is mounted on a vehicle, since the hydrogen tank is fixedly mounted on the vehicle, attachment/detachment and transportation of the hydrogen tank has not been considered much. When the hydrogen tank is transported, the hydrogen tank is required to have high impact resistance in preparation for falling. In order to improve the impact resistance, it is conceivable to protect a pressure vessel or a tank body containing the hydrogen gas with a protector. However, the pressure vessel expands or contracts as an internal pressure changes. When the pressure vessel is placed as it is around the pressure vessel, the protector cannot follow the expansion or contraction of the pressure vessel.

In view of the above circumstances, an object of the present disclosure is to provide a fluid tank capable of suppressing deformation of a protector for protecting a pressure vessel even when the pressure vessel containing a fluid expands or contracts.

A fluid tank according to an aspect of the present disclosure includes: a pressure vessel in which a fluid is contained; a first dome protector and a second dome protector disposed facing each other across the pressure vessel in a longitudinal direction of the pressure vessel; and a connecting member that connects the first dome protector and the second dome protector. In the fluid tank according to the present disclosure, the connecting member is connected to the first dome protector and the second dome protector such that a distance between the first dome protector and the second dome protector is able to be changed.

The fluid tank according to the present disclosure can suppress deformation of the protector protecting the pressure vessel even when the pressure vessel containing the fluid expands or contracts.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
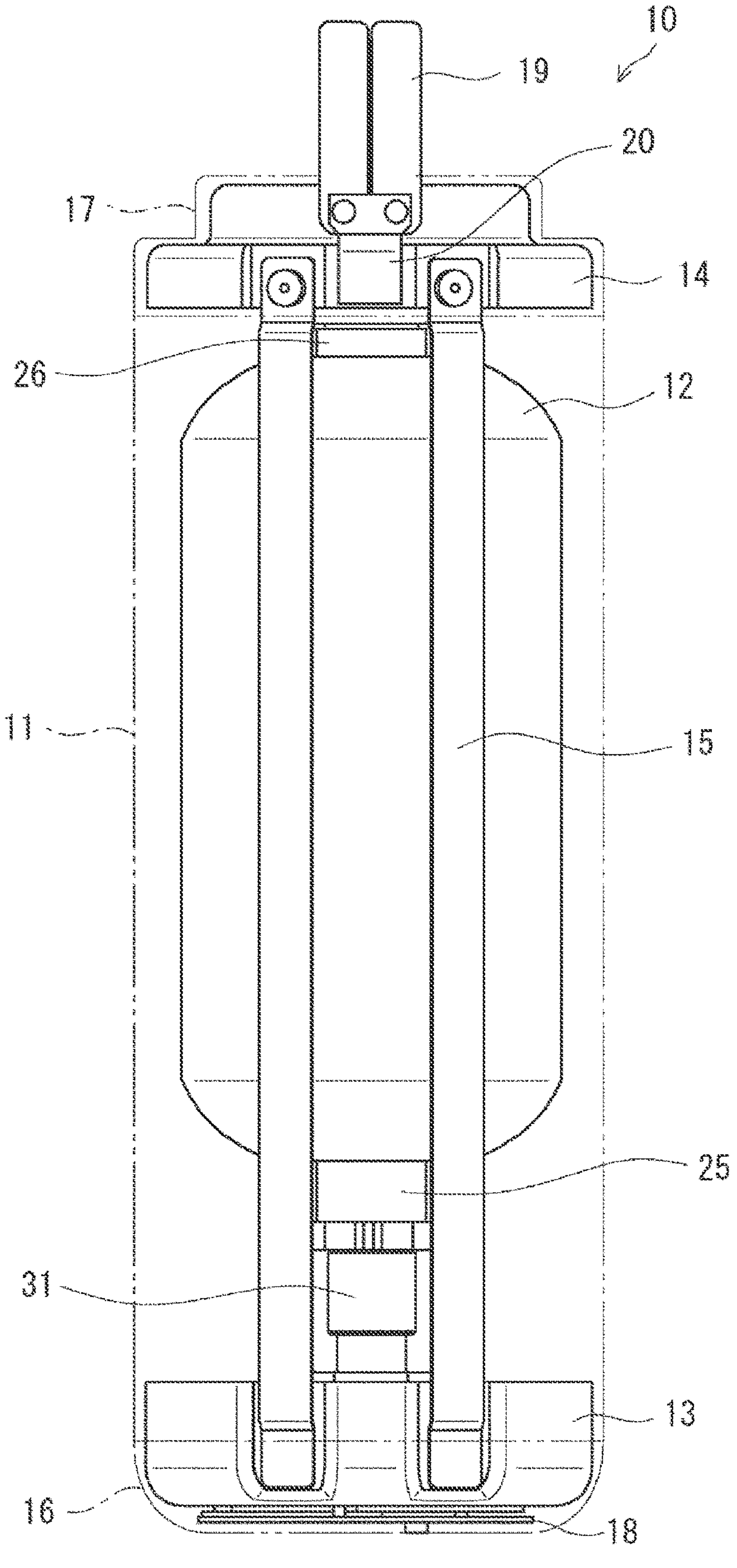
FIG. 1 is a side view of a fluid tank according to an embodiment of the present disclosure.

Hereinafter, embodiments of the present disclosure will be described in detail with reference to the drawings. Note that the following description and the drawings are omitted and simplified as appropriate for clarity of description. In addition, the drawings are not necessarily to scale. In the drawings, the same elements and the same elements are denoted by the same reference numerals, and redundant description is omitted as necessary.

Figure 2:
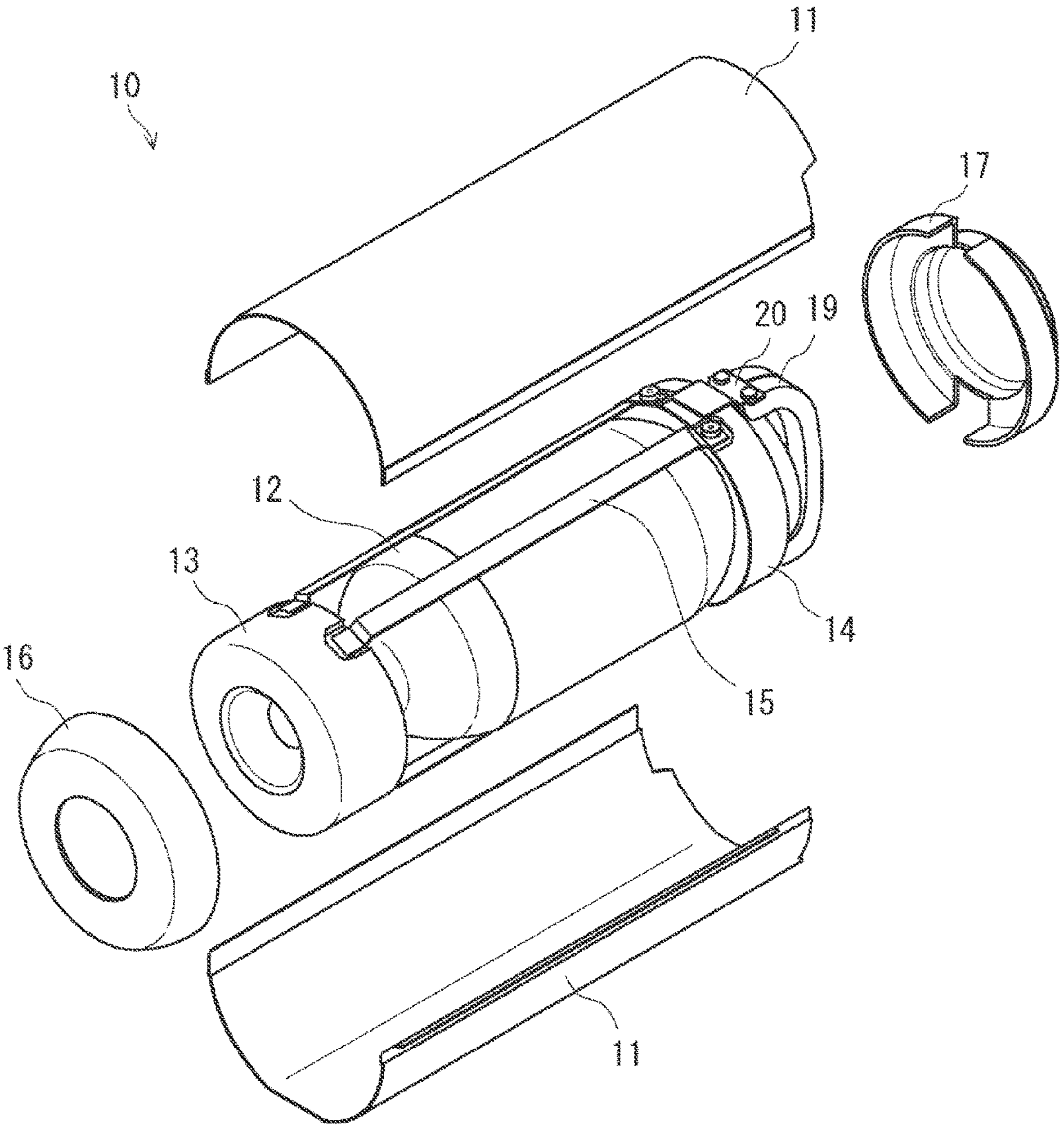
FIG. 2 is an exploded perspective view of the fluid tank.
Figure 3:
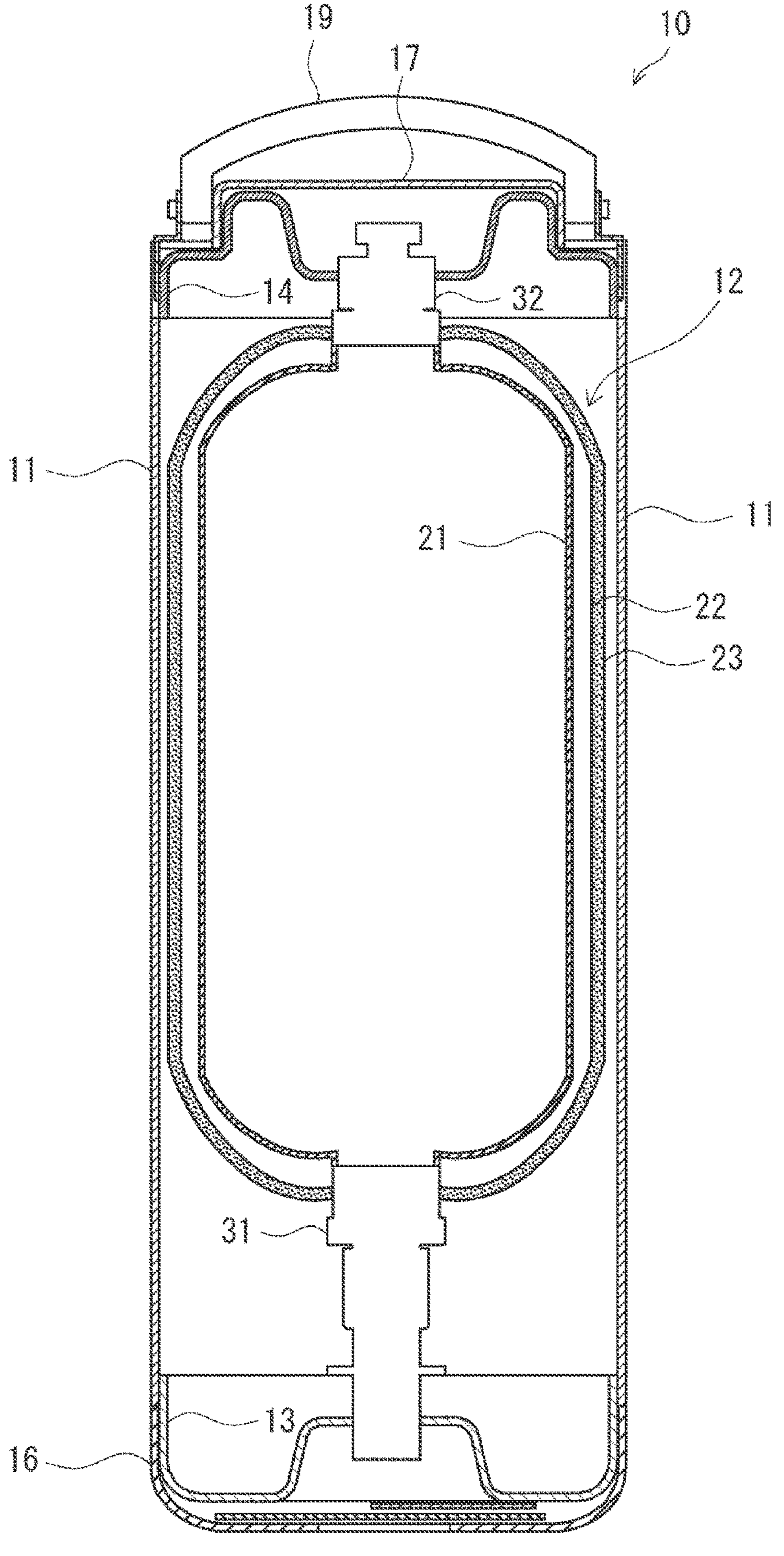
FIG. 3 is a cross-sectional view showing the fluid tank.

FIG. 1 is a side view illustrating a fluid tank according to an embodiment of the present disclosure. FIG. 2 is an exploded perspective view of the fluid tank. FIG. 3 is a cross-sectional view showing the fluid tank. The fluid tank 10 includes an exterior resin protector 11, a pressure vessel 12, metal domes 13 and 14, a plurality of stays 15, resin covers 16 and 17, a shutter 18, and a handle 19. In the present embodiment, the fluid tank 10 is configured as a portable cartridge-type pressure tank.

The pressure vessel 12 is a vessel in which a fluid such as a high-pressure gas is accommodated. The pressure vessel 12 contains a high-pressure fluid, for example 10~70 MPa. Hereinafter, the pressure vessel 12 mainly contains hydrogen gas. The pressure vessel 12 is also referred to as a tank body. The pressure vessel 12 may be, for example, an automotive vessel, i.e., a pressure tank manufactured based on technical standards required for a hydrogen tank mounted on a vehicle, such as a fuel cell electric vehicle.

As shown in FIG. 3, the pressure vessel 12 includes a liner 21, a reinforcing layer 22, and a heat insulating layer 23. The liner 21 is a tank container having an internal space for sealing a fluid. The liner 21 is formed of, for example, a resin made of nylon. The liner 21 may be formed of polyethylene, polypropylene, or other resin having a gas barrier property against hydrogen gas such as polyester. Alternatively, the liner 21 may be formed of metal.

The pressure vessel 12 has bases 25 and 26 (see FIG. 1) at both longitudinal ends, respectively. The bases 25 and 26 are mounted on the top of the dome portion of the liner 21 so as to protrude from both ends of the liner 21. Bases 25 and 26 may be used to fill the pressure vessel 12 with gas and to release gas from the pressure vessel 12.

In the present embodiment, an attachment/detachment valve 31 attached to an application is connected to the base 25. The attachment/detachment valve 31 is connected to a fuel cell and a valve disposed on an application side using hydrogen gas such as a hydrogen engine. The attachment/detachment valve 31 may include a main stop valve (not shown), a manual valve, a check valve, and the like. After the attachment/detachment valve 31 is connected to a valve disposed on the application side, the hydrogen gas in the pressure vessel 12 is supplied to the application.

In the present embodiment, the safety valve 32 is connected to the base 26. The safety valve 32 is a heat-actuated safety valve or a melt plug valve, and releases the gas in the pressure vessel 12 into the atmosphere as the temperature rises, for example, when the heat due to a fire or the like is detected. For example, the safety valve 32 comprises a metallic material, such as an alloy of lead and tin. The metallic material normally blocks the discharge of the base 26. The metallic material melts when the temperature exceeds a predetermined temperature, such as 110° C. When the metallic material dissolves above the melting point, the discharge passage communicates with the outside, and the hydrogen gas inside the pressure vessel 12 is discharged to the outside through the discharge passage.

The reinforcing layer 22 is formed on the outer surface of the liner 21. The reinforcing layers 22 are formed of, for example, Fiber Reinforced Plastics (FRP). For example, the reinforcing layer 22 is formed by winding a bundle of carbon fibers impregnated with an epoxy resin, which is a thermosetting resin, on the surface of the liner 21 by a filament winding method, and thermally curing the bundle. As the thermosetting resin, a resin such as a polyester resin or a polyamide resin may be used in addition to an epoxy resin.

The heat insulating layer 23 is formed on the outer surface of the reinforcing layer 22. The heat insulating layer 23 is a layer formed of a flame retardant material. The heat insulating layer 23 is used for the purpose of suppressing the propagation of heat and flame to the reinforcing layer 22 and the liner 21. The insulating layer 23 is formed over the entire circumference on the outer surface of the reinforcing layer 22, for example by lamination molding. As the material of the heat insulating layer, for example, a flame-retardant rigid urethane as a plastic foam is used. The heat insulating layer 23 may be formed using a resin material to which expanded graphite is added, or various flame retardant materials such as glass wool. Alternatively, the heat insulating layer 23 may be formed using a non-combustible material made of an inorganic material or a metal material. The heat insulating layer 23 may also serve as a cushioning material.

The pressure vessel 12 may have a heat transfer layer formed of a material having a flame propagation property higher than that of the heat insulating layer on the outer surface of the heat insulating layer 23. For example, the heat transfer layer may be formed using polyacetal as an engineering plastic having a heat resistance temperature of 100 degrees Celsius. The heat transfer layer may be formed using various synthetic resins such as plastic or super engineering plastic, or elastomeric materials including rubber materials.

The metal domes 13 and 14 are dome protectors that protect the pressure vessel 12 at both ends of the pressure vessel 12. The metal dome 13 is arranged at one end of the pressure vessel 12 in the longitudinal direction. The metal dome 14 is disposed at the other end of the pressure vessel 12. The metal domes 13 and 14 are connected to each other by a connecting member. In the present embodiment, a plurality of plate-shaped stays 15 is used as the connecting member. The metal dome 13 is also referred to as a first dome protector. The metal dome 14 is also referred to as a second dome protector. The dome protector is not necessarily made of metal. The dome protector may be formed of, for example, a resin having sufficient strength.

In the present embodiment, the metal dome 13 is disposed at the end of the pressure vessel 12 on the side to which the attachment/detachment valve 31 is attached. The metal dome 13 has a recess and an opening in which a part of the attachment/detachment valve 31 is accommodated. The metal dome 13 has a shutter 18 for protecting the attachment/detachment valve 31. The metal dome 13 is covered with a resin cover 16 that is a resin cover. The resin cover 16 has an opening for accessing the attachment/detachment valve 31.

In the present embodiment, the metal dome 14 is arranged at the end of the pressure vessel 12 on the side to which the safety valve 32 is attached. The metal dome 14 has a protrusion having a diameter smaller than an outer diameter of the fluid tank 10. The metal dome 14 has a recess and an opening in the protrusion to accommodate a portion of the safety valve 32. At least an opening portion of the metal dome 14 in which the safety valve 32 is accommodated is covered by the resin cover 17.

The exterior resin protector 11 is a resin protector that covers the cylindrical portion of the pressure vessel 12 from the periphery. The exterior resin protector 11 functions as a design case and a cover of the fluid tank 10. The exterior resin protector 11 is divided into two parts, for example, as shown in FIG. 2. The two parts of the exterior resin protector 11 are mounted between the two metal domes 13 and 14 so as to sandwich the pressure vessel 12 from the two directions.

Although FIG. 2 shows an example in which the exterior resin protector 11 is divided into two parts, the present embodiment is not limited to this. The exterior resin protector 11 may be divided into three or more portions. Further, the exterior resin protector 11 does not need to be divided into a plurality of portions, and may be a cylindrical protector. The exterior resin protector 11 may at least partially cover the periphery of the pressure vessel 12. The exterior resin protector 11 does not necessarily cover the entire circumference of the pressure vessel 12.

The handle 19 is connected to the metal dome 14 via a hinge bracket 20. In this embodiment, the handle 19 has two handle portions that are divided into two portions. Each handle portion is rotatable via a hinge. Each handle portion is receivable along a protrusion of the metal dome 14 when not in use. The user can grasp the handle 19 and carry the fluid tank 10 to the location where the application is installed. The user can also grasp the handle 19 to lift the fluid tank 10 and attach the fluid tank 10 to the application. When the hydrogen gas is exhausted, the user can remove the fluid tank 10 from the application using the handle 19 and attach a new fluid tank 10 to the application.

In the present embodiment, the fluid tank 10 can be repeatedly attached and detached. When the fluid tank 10 is repeatedly attached and detached, there is a possibility that the exterior of the fluid tank 10, particularly the exterior resin protector 11, is scratched. In the present embodiment, the surface of the exterior resin protector 11 may be embossed. In this case, even when the surface of the resin is scratched, it is possible to make the scratch less noticeable.

In the present embodiment, the stay 15, which is a connecting member, is connected to the metal dome 13 and the metal dome 14 so that the distance between the metal dome 13 and the metal dome 14 can be changed. The stay 15 is slidably attached to at least one of the metal dome 13 and the metal dome 14, for example. For example, the stay 15 is slidably attached to the metal dome 14. The stay 15 may be firmly fixed to the metal dome 13. For example, the stay 15 may be fixed to the metal dome 13 by welding.

Figure 4:
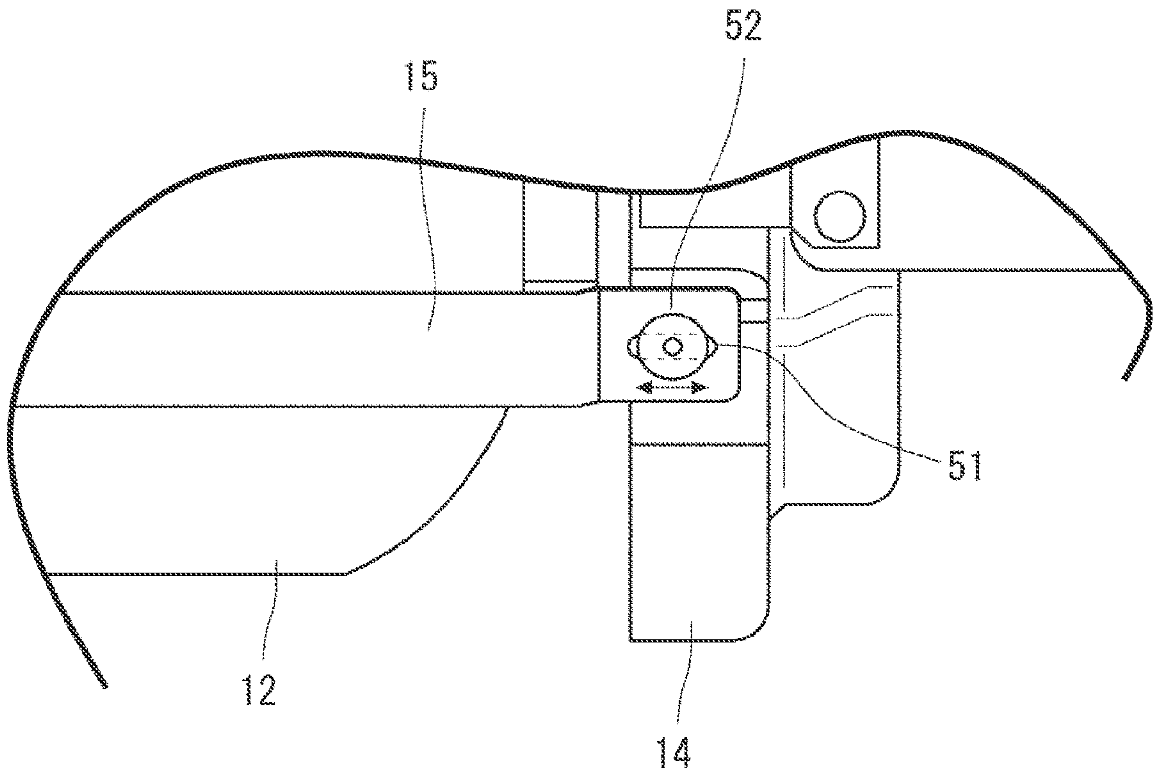
FIG. 4 is a diagram illustrating a connection portion between a metal dome and a stay.

FIG. 4 is a diagram illustrating a connection portion between the metal dome 14 and the stay 15. As shown in FIG. 4, the stay 15 is formed with an elongated hole 51 having a diameter in the tank longitudinal direction longer than a diameter in a direction orthogonal thereto. In addition, a screw hole into which a bolt 52 for fastening is inserted is formed in the metal dome 14. The diameter of the elongated hole 51 in the tank longitudinal direction is longer than the outer diameter of the bolt shaft. The metal dome 14 is slidably attached to the stay 15 together with the bolt 52 with respect to the stay 15 within the range of the diameter of the elongated hole 51 in the tank longitudinal direction.

The pressure vessel 12 may vary in size due to changes in internal pressure. For example, when the pressure vessel 12 expands and the length in the tank longitudinal direction increases, the metal dome 14 can slide with respect to the stay 15 in a direction in which the distance from the metal dome 13 disposed at the opposite position via the stay 15 increases. Therefore, even when the size of the pressure vessel 12 changes, the distance between the metal dome 13 and the metal dome 14 can be changed in accordance with the change in the size of the pressure vessel 12.

Figure 5:
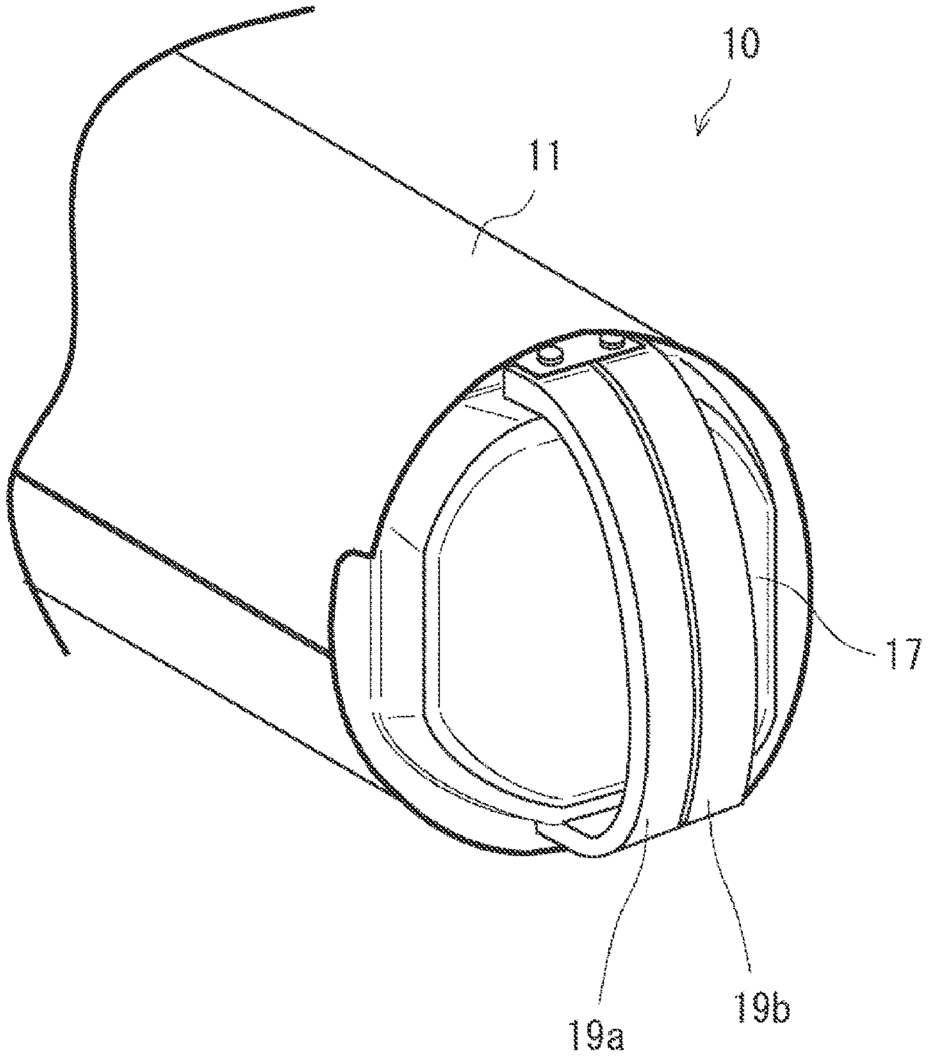
FIG. 5 is a perspective view of the fluid tank from the handle side.

FIG. 5 is a perspective view of the fluid tank 10 viewed from the handle 19 side. In this instance, the handle 19 is divided into a handle 19*a* and a handle 19*b*. The handle 19*a* and 19*b* are each formed in a semicircular shape. The handle 19*a* and 19*b* are rotatably attached to the metal dome 14 via hinges provided in the hinge brackets 20 (see FIGS. 1 and 2).

In the condition shown in FIG. 5, the user can grasp the handle 19*a* and 19*b* and carry the fluid tank 10 to a location where hydrogen-energy is used. The user can also grasp the handle 19*a* and 19*b* and rotate the handle 19*a* and 19*b* about the longitudinal axis of the fluid tank 10. The rotational force applied to the handle 19*a* and 19*b* is applied to the hinge bracket 20, the metal dome 14, the stay 15, the pressure vessel 12, and the metal dome 13 to rotate the entire fluid tank 10. The user can rotate the attachment/detachment valve 31 integrally with the fluid tank 10 to attach the fluid tank 10 to the application.

Figure 6:
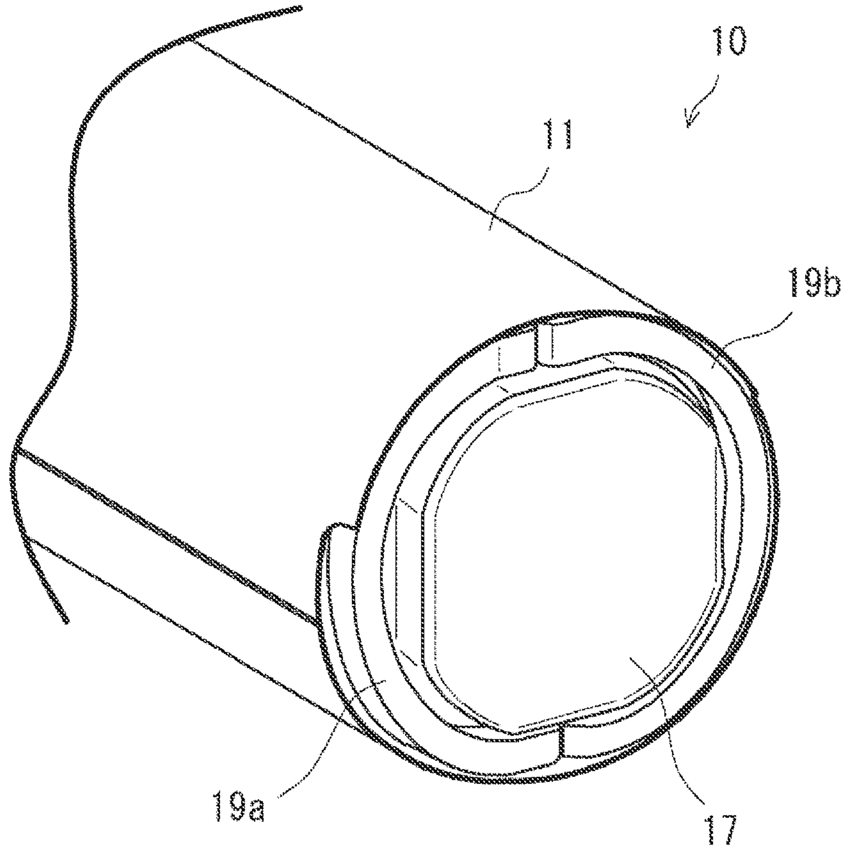
FIG. 6 is a perspective view showing the fluid tank in a state in which the handle is stored.

FIG. 6 is a perspective view showing the fluid tank 10 in a state in which the handle 19 is stored. After transporting the fluid tank 10 or after attaching the fluid tank 10 to the application, the user can rotate the handle 19*a* and 19*b* about 90 degrees to store the handle 19*a* and 19*b* between the protrusions of the metal dome 14 and the exterior resin protector 11.

Here, a safety valve 32 is disposed at an end of the fluid tank 10 opposite to the end where the attachment/detachment valve 31 is disposed. When attaching the handle to the metal dome 14, the distance between the handle and the safety valve must be maintained so that the handle does not interfere with the safety valve 32. Thus, if the handle is not retractable, the longitudinal length of the fluid tank 10 is increased by the length of the handle. A configuration is also conceivable in which the handle is configured to be slidable longitudinally relative to the metal dome 14 and in which the handle is withdrawn in use. However, even in this case, the length in the tank longitudinal direction becomes longer by the thickness of the handle.

In the present embodiment, the handle 19 is divided into two parts, and the divided handle 19*a* and 19*b* are configured to be retractable between the protrusion of the metal dome 14 and the exterior resin protector 11. In this way, the user can grasp the handle when using the handle 19 to carry the fluid tank 10, while the size of the handle 19 in the tank longitudinal direction when not in use can be made compact.

Figure 7:
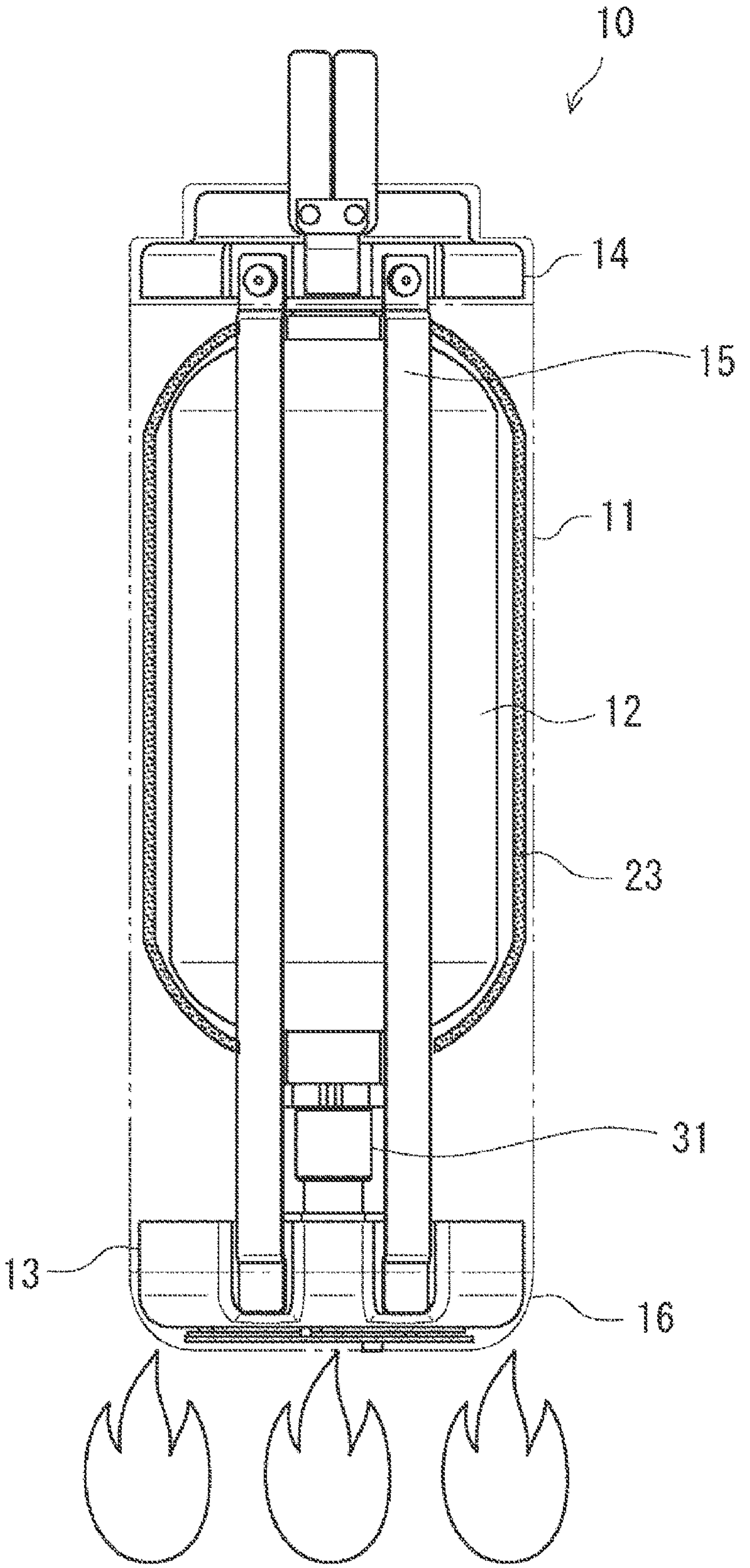
FIG. 7 is a schematic view showing a fluid tank in a case where a fire occurs.

FIG. 7 is a schematic diagram showing the fluid tank 10 when a fire occurs near the fluid tank 10. When the fluid tank 10 is configured as a portable cartridge type tank, it is considered that the fluid tank 10 is stored upright such that the side of the attachment/detachment valve 31 is lower and the side of the safety valve 32 (see FIG. 3) is upper. In this case, when a fire occurs near the fluid tank 10, it is considered that the metal dome 13 and the resin cover 16 on the side of the attachment/detachment valve 31 are more exposed to a heat source, that is, a flame, as shown in FIG. 7.

The exterior resin protector 11 is formed of a combustible material. In FIG. 7, when the metal dome 13 is exposed to a flame, it is considered that the exterior resin protector 11 burns from the metal dome 13 side. The fire attached to the exterior resin protector 11 spreads to the end portion on the metal dome 14 side, and the heat due to the fire is transmitted to the safety valve 32. In the safety valve 32, when the metal material of the plug valve dissolves, the discharge path of the pressure vessel 12 communicates with the outside, and the high-pressure gas in the pressure vessel 12 is discharged to the outside.

In the present embodiment, by actively burning the exterior resin protector 11 when a fire occurs, even when a fire occurs on the side opposite to the safety valve 32, heat caused by the fire can be quickly propagated to the safety valve 32. On the other hand, the pressure vessel 12 is covered with a heat insulating layer 23, and the heat insulating layer 23 suppresses heat caused by a fire from being transmitted to the liner 21 and the reinforcing layer 22. In the present embodiment, when a fire occurs, heat input to the liner 21 and the reinforcing layer 22 can be prevented by using the heat insulating layer 23. In the present embodiment, by using the exterior resin protector 11 for heat transfer to the safety valve 32, the safety valve 32 can be operated quickly. Therefore, it is possible to effectively suppress the internal pressure of the pressure vessel 12 from being abnormally increased and the pressure vessel 12 from being ruptured when a fire occurs.

Figure 8:
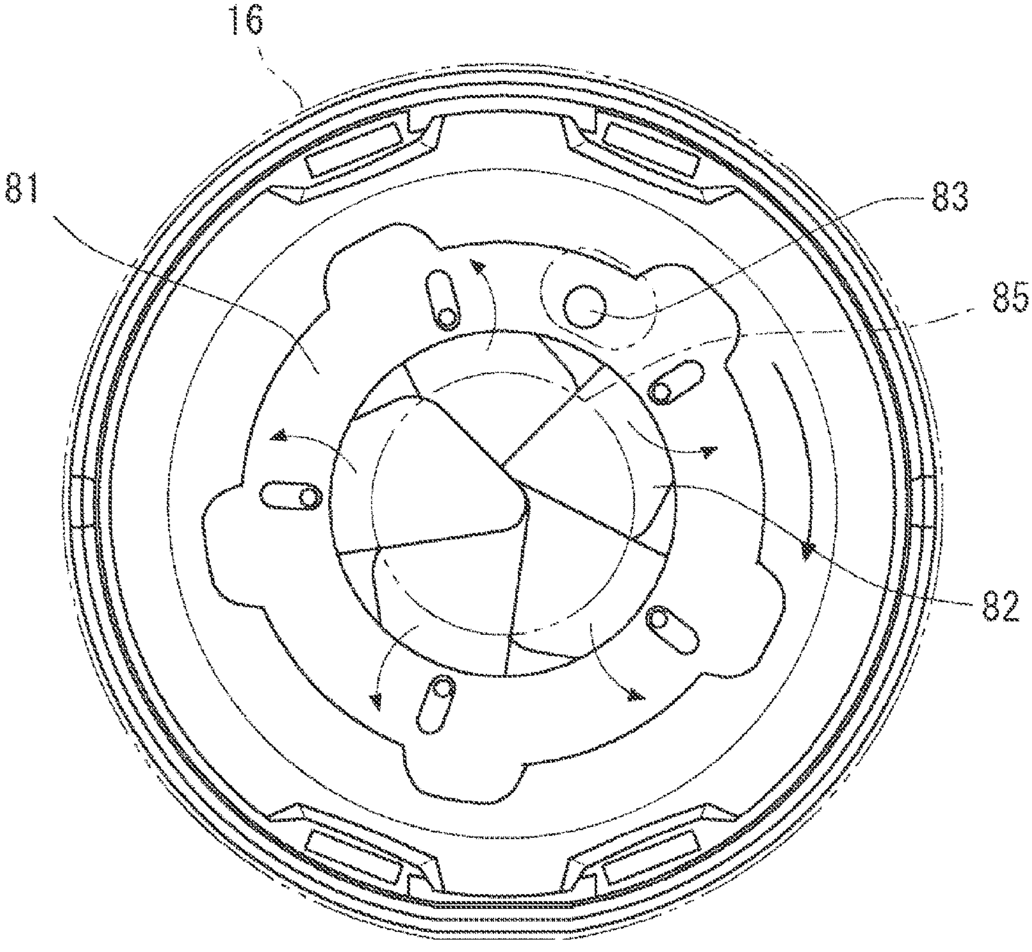
FIG. 8 is a front view of the fluid tank as viewed from the metal dome side with the shutter closed.

Next, a configuration example of the shutter 18 will be described. FIG. 8 is a front view of the fluid tank 10 viewed from the side of the metal dome 13 in a state in which the shutter 18 is closed. In this example, the shutter 18 has a rotation ring 81 and five blades 82. The rotation ring 81 has an opening in the central portion. Further, the rotation ring 81 has an opening/closing lever 83 operated by a user. The rotation ring 81 rotates, for example, in a clockwise direction, when the user moves the opening/closing lever 83 from the "closed" position to the "open" position. The rotation ring 81 rotates counterclockwise when the user moves the opening/closing lever 83 from the "open" position to the "closed" position. The five blades 82 are displaced from a position at which the opening of the rotation ring 81 is closed to a position at which the opening is not closed in accordance with the rotational position of the rotation ring 81.

When the fluid tank 10 is transported, the user puts the opening/closing lever 83 in the "closed" position. In the "closed" state of the shutter 18, the opening of the rotation ring 81 is closed by five blades 82, as shown in FIG. 8. In this case, the opening 85 of the resin cover 16 is closed by the shutter 18, and the attachment/detachment valve 31 is protected by the shutter 18. The user can carry the fluid tank 10 in a state in which the attachment/detachment valve 31 is not exposed to the outside from the metal dome 13, and can prevent foreign matter from entering the attachment/detachment valve 31.

Figure 9:
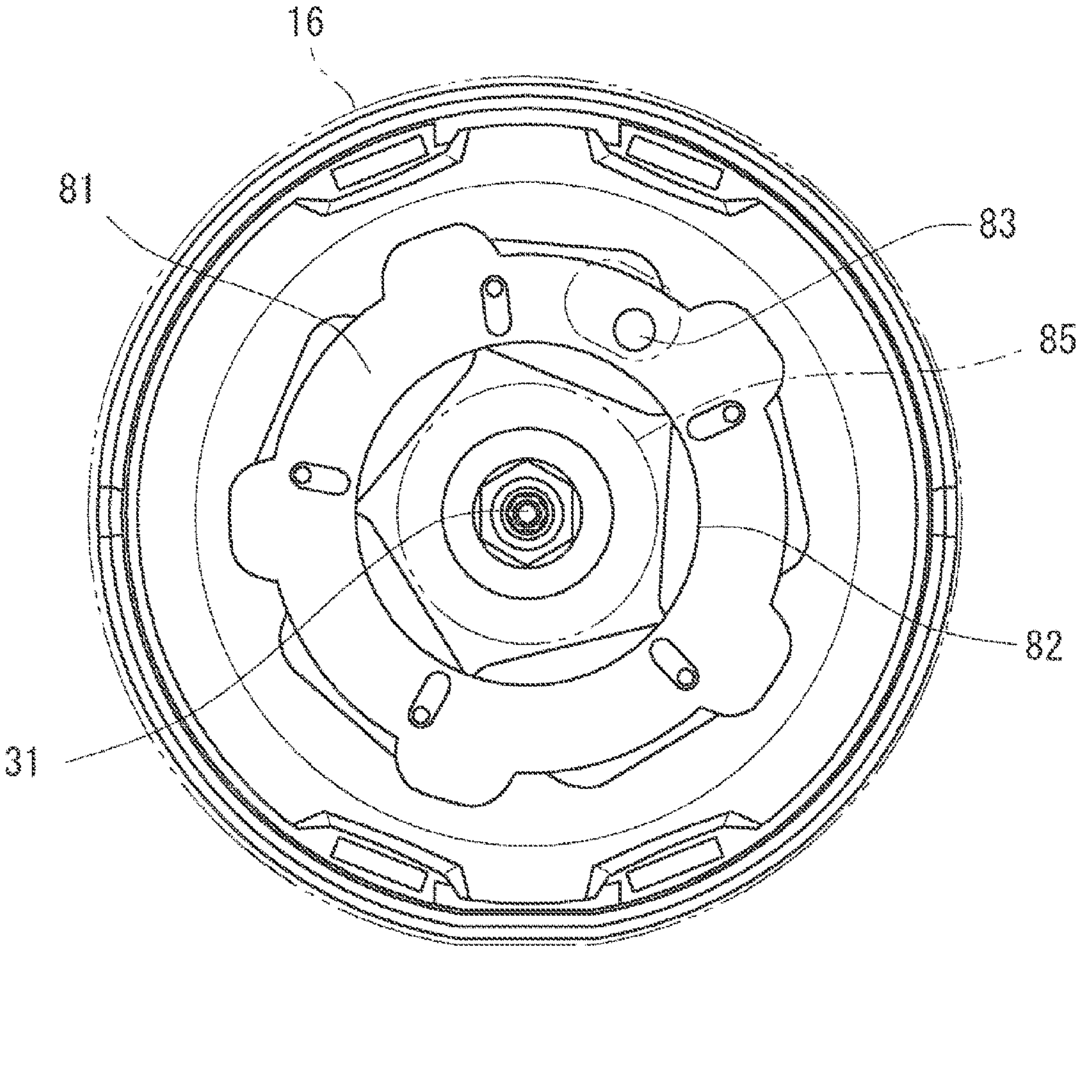
FIG. 9 is a front view of the fluid tank as viewed from the metal dome side with the shutter open.

FIG. 9 is a front view of the fluid tank 10 as viewed from the side of the metal dome 13 when the shutter 18 is open. When the user attaches the fluid tank 10 to the application, the user puts the opening/closing lever 83 in the "open" position. In the "open" state of the shutter 18, the five blades 82 are displaced toward the rotation ring 81. In this case, the attachment/detachment valve 31 is visible through the opening 85 of the resin cover 16. The user can attach the fluid tank 10 to the application in a state where the attachment/detachment valve 31 is accessible from the outside.

In the above description, an example has been described in which the shutter 18 is a type of shutter whose opening and closing is controlled in accordance with the rotation of the rotation ring 81. However, the present embodiment is not limited to this. Various shutters can be used as the shutters for protecting the attachment/detachment valve 31. Instead of using the shutter 18, the attachment/detachment valve 31 may be protected by attaching a dust-proof cap or a protective cap to the metal dome 13. However, in that case, it is necessary to remove the dust-proof cap from the metal dome 13 when the dust-proof cap is attached to the application. Further, while the fluid tank 10 is attached to the application, it is necessary to store the dust-proof cap without loss in preparation for subsequent transportation.

Here, as a technical standard of a hydrogen tank, there is a technical standard of a container for an automobile. In this embodiment, the fluid tank 10 may be designed on the basis of technical standards for automotive containers. However, it is assumed that the in-vehicle hydrogen tank is fixed and does not require attachment and detachment, whereas the fluid tank 10 according to the present embodiment is a cartridge-type tank, and is portable and detachable from an application. In some embodiments, the fluid tank 10 may be designed in consideration of not only the technical standards of the automobile container that is fixed and does not involve detachment but also the technical standards of the general composite container.

For example, the height of the drop test in the automotive container is set to be 1.8 m assuming that the vehicle is dropped from the height of a typical forklift when the vehicle is assembled. However, the fluid tank 10 according to the present embodiment is portable, and it is assumed that the fluid tank 10 falls from a position higher than 1.8 m. In addition, in a drop test of a container for an automobile, it is assumed that a hydrogen tank falls to a horizontal plane. However, the fluid tank 10 according to the present embodiment may fall into a portion having an angle shape instead of a horizontal plane.

As for the fire, the container fixed to the vehicle is mounted on the vehicle so that the longitudinal direction thereof is horizontal to the ground, and therefore, according to the technical standards for the automobile container, a fire is assumed when the container is placed in the direction. However, the fluid tank 10 according to the present embodiment is expected to be placed perpendicularly to the ground, like a general pressure vessel. That is, the fluid tank 10 is expected to be placed in a posture in which the container is erected so that the safety valve 32 is on the upper side. In that case, in the event of a fire, it is expected that the end opposite the safety valve 32 will first be exposed to the flame. It is believed that the falling of the container and the flame test in consideration of the actual safety described above will be very severe for the test of the automotive container.

In the present embodiment, the fluid tank 10 includes an exterior resin protector 11 around the pressure vessel 12. The fluid tank 10 can improve the safety of the pressure vessel 12 containing the fluid by providing the exterior resin protector 11 having the design property with a function as a protective protector. More specifically, by protecting the pressure vessel 12 using the exterior resin protector 11, even when the fluid tank 10 falls while the fluid tank 10 is being transported, for example, the pressure vessel 12 can be protected from a drop impact or the like. In addition, when a fire occurs, the exterior resin protector 11 transmits heat to the safety valve 32, so that the safety valve 32 can be operated quickly, and the rupture of the pressure vessel 12 and the like can be suppressed.

In the present embodiment, the stay 15 is attached to the metal dome 13 and the metal dome 14 so that the distance between the metal dome 13 and the metal dome 14 can be changed. In the present embodiment, the distance between the metal dome 13 and the metal dome 14 can be changed in accordance with the change in the size of the tank caused by the expansion and contraction of the pressure vessel 12. Therefore, even when the pressure vessel 12 expands or contracts, the stress applied to the stay 15 and the exterior resin protector 11 can be suppressed, and the deformation of the exterior resin protector 11 can be suppressed.

In this embodiment, the handle 19 is divided into a handle 19*a* and a 19*b* (see FIG. 6), and when the handle is not used, the handle 19*a* and 19*b* are retracted along the sides of the protrusions of the metal dome 14. In the present embodiment, when the handle is not used, the divided handle 19*a* and 19*b* can be accommodated between the exterior resin protector 11 and the protrusion of the metal dome 14, so that the longitudinal size of the fluid tank 10 can be made compact.

Since the fluid tank 10 according to the present embodiment is portable, it can be used as a cartridge-type hydrogen tank used for transporting hydrogen gas to a place where an application using hydrogen gas is installed. Cartridge-type hydrogen tanks are easy to transport and attach to applications, and can be used to build a hydrogen supply chain that can enter like capillaries into the living sphere.

Figure 10:
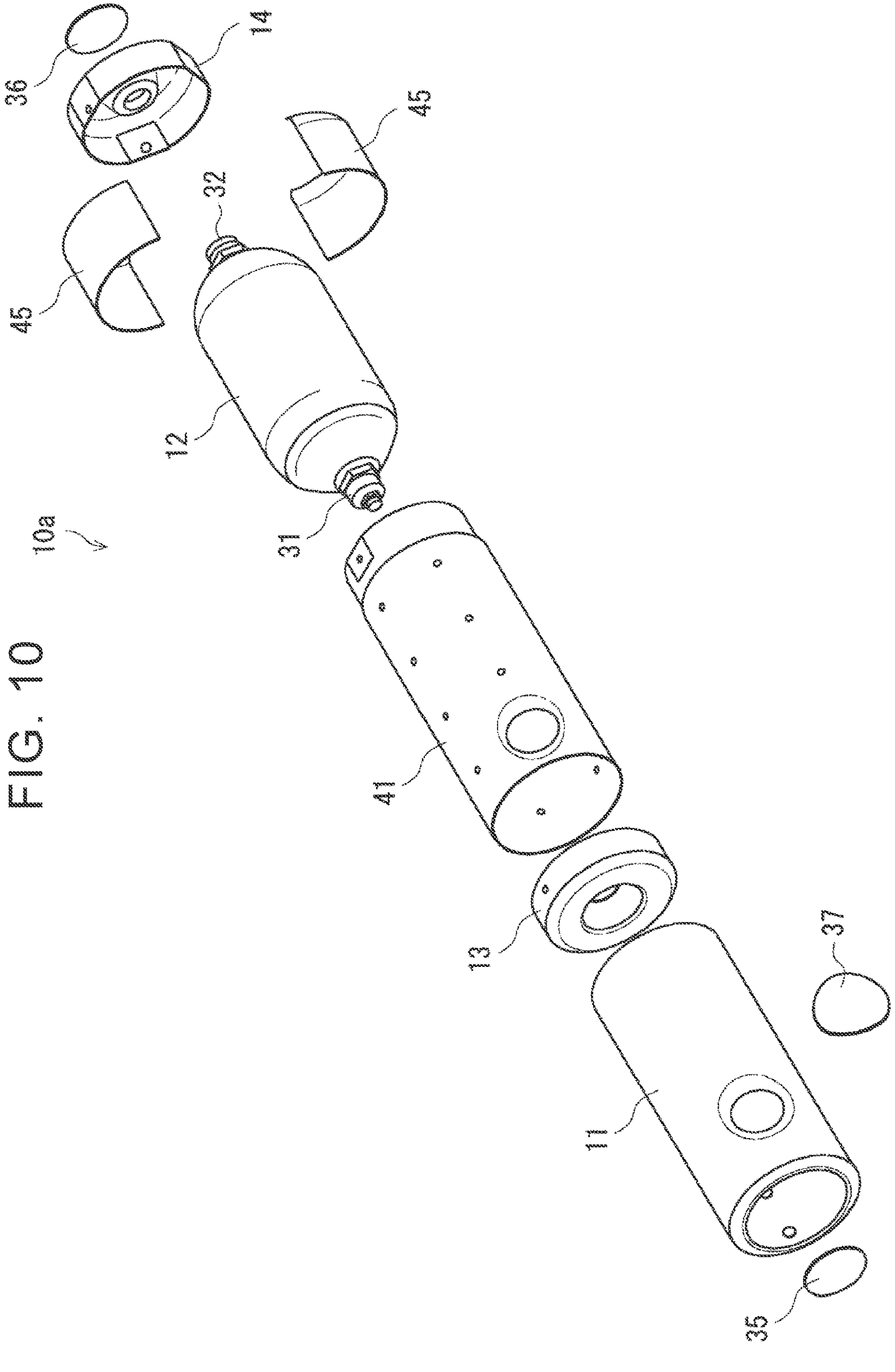
FIG. 10 is an exploded perspective view showing a fluid tank according to a first modification.

In the above embodiment, an example has been described in which a plurality of plate-shaped stays 15 are used as connecting members for connecting the first dome protector and the second dome protector. However, the present disclosure is not limited thereto. The connecting member may be a cylindrical member that at least partially covers the pressure vessel 12. FIG. 10 is an exploded perspective view illustrating a fluid tank according to a first modification. The fluid tank 10*a* according to the first modification includes an exterior resin protector 11, a pressure vessel 12, metal domes 13 and 14, and a metal pipe 41. In FIG. 10, the handle 19 (see FIG. 2) is not shown.

In the present modification, the metal pipe 41 is used as a connecting member instead of the plurality of stays. The metal pipe 41 is connected to the metal domes 13 and 14 so that the distance between the metal dome 13 and the metal dome 14 can be changed. The metal pipe 41 is firmly fixed to the metal dome 13 on the attachment/detachment valve 31 side using, for example, a fastening bolt. The metal pipe 41 is slidably attached to the metal dome 14 on the side of the safety valve 32. For example, in a portion of the metal pipe 41 that is connected to the metal dome 14, an elongated hole having a diameter in the tank longitudinal direction longer than a diameter in a direction orthogonal thereto is formed. The metal dome 14 is slidably attached to the metal pipe 41 with respect to the metal pipe 41 within the range of the diameter of the elongated hole in the tank longitudinal direction. The portion of the metal dome 14 in which the safety valve 32 is housed is covered by a protective cap 36.

In this modification, the exterior resin protector 11 covers the metal pipe 41 between the metal dome 13 and the metal dome 14 in the tank longitudinal direction. The exterior resin protector 11 may be integrally formed with the metal pipe 41 by insert molding or the like. In this modification, the connecting portion between the metal pipe 41 and the metal dome 14 is covered with the garnish 45. The metal pipe 41 has a hole for operating a manual valve provided in the attachment/detachment valve 31 on a side surface in the tank longitudinal direction. The exterior resin protector 11 also has a hole on a side surface in the longitudinal direction of the tank for operating a manual valve provided in the attachment/detachment valve 31. A protective cap 35 is attached to a portion of the metal dome 13 where the attachment/detachment valve 31 is accommodated. A manual valve cap 37 is attached to a hole for operating the manual valve of the exterior resin protector 11. The protective cap 35 is removed when the fluid tank 10*a* is attached to the application. The manual valve cap 37 is also removed when the user operates the manual valve.

In this modification, the pressure vessel 12 can be protected by the exterior resin protector 11 and the metal pipe 41. Also in this modification, when a fire occurs on the side of the attachment/detachment valve 31, heat can be transferred to the side of the safety valve 32 due to the burning of the exterior resin protector 11, and the explosion of the pressure vessel 12 and the like can be suppressed by operating the safety valve 32. In the present modification, the protective cap 35 is used to protect the attachment/detachment valve 31. For example, by attaching the protective cap 35 to the metal dome 13 when the fluid tank 10*a* is transported, it is possible to prevent foreign matter from entering the attachment/detachment valve 31.

Figure 11:
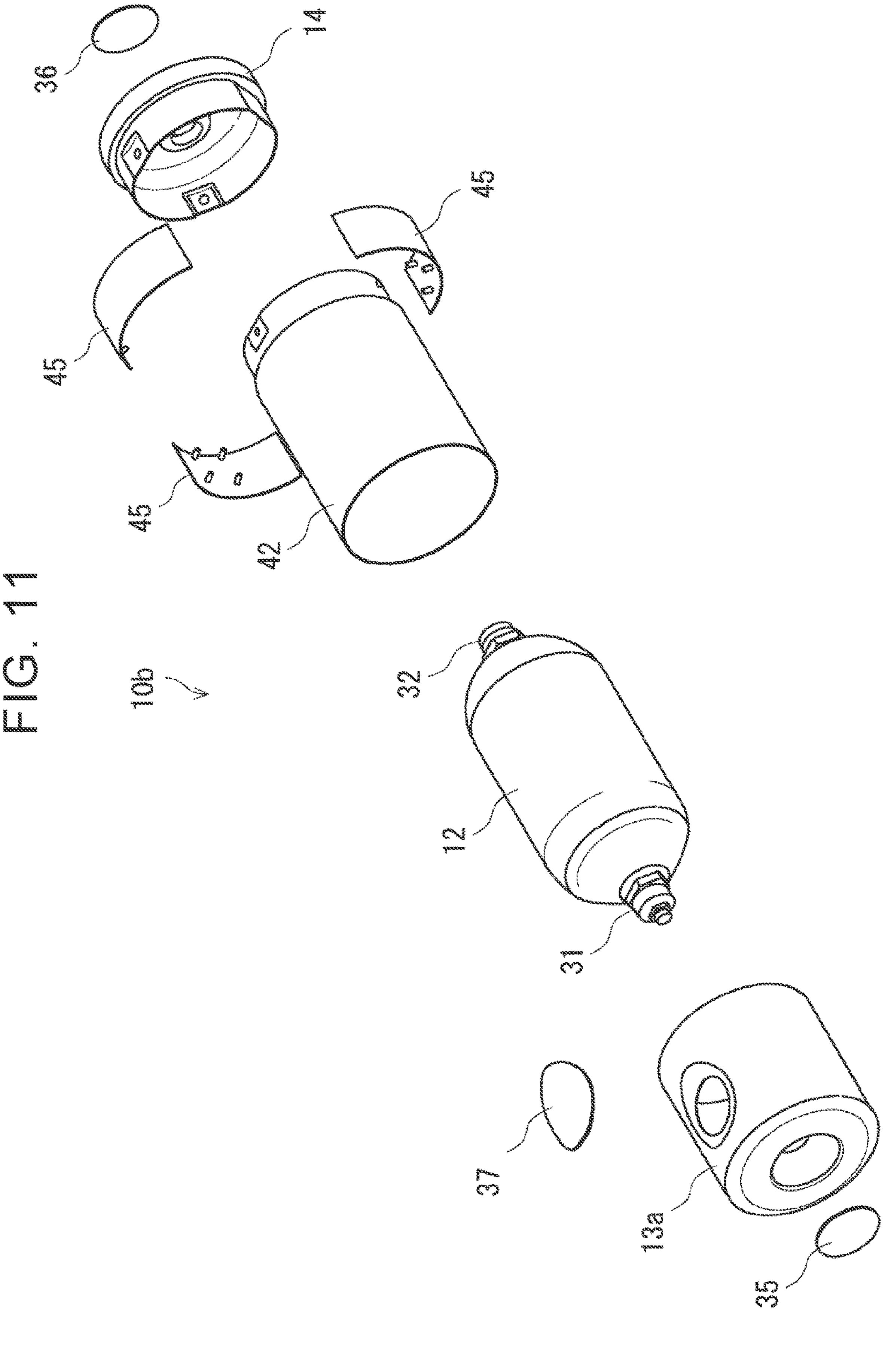
FIG. 11 is an exploded perspective view showing a fluid tank according to a second modification.

FIG. 11 is an exploded perspective view illustrating a fluid tank according to a second modification. A fluid tank 10*b* according to a second variant comprises a pressure vessel 12, a metal dome 13*a* and 14 and a metal pipe 42. In FIG. 11, the handle 19 (see FIG. 2) is not shown. In the present modification, the metal pipe 42 is used as a connecting member instead of the plurality of stays. In this modification, the exterior resin protector 11 is omitted, and the metal pipe 42 functions as an exterior protector.

The metal pipe 42 is connected to the metal dome 13*a* and the metal dome 14 such that the distance between the metal dome 13*a* and the metal dome 14 can be varied, similar to the metal pipe 41 in the first variant (see FIG. 10). The metal pipe 42 is firmly fixed to the metal dome 13*a* of the attachment/detachment valve 31 using, for example, a fastening bolt. The metal pipe 42 is slidably attached to the metal dome 14 on the side of the safety valve 32. For example, in a portion of the metal pipe 42 that is connected to the metal dome 14, a elongated hole having a diameter in the tank longitudinal direction longer than a diameter in a direction orthogonal thereto is formed. The metal dome 14 is slidably attached to the metal pipe 42 with respect to the metal pipe 42 within the tank longitudinal diameter of the elongated hole. The portion of the metal dome 14 in which the safety valve 32 is housed is covered by a protective cap 36. In this modification, the connecting portion between the metal pipe 42 and the metal dome 14 is covered with the garnish 45.

In this modification, the metal dome-shaped 13*a* has a hole for operating a manual valve provided in the attachment/detachment valve 31. A protective cap 35 is attached to a part of the metal dome 13*a* in which the attachment/detachment valve 31 is accommodated. In addition, a manual valve cap 37 is attached to a bore for operating the manual valve of the metal dome 13*a*. The protective cap 35 is removed when the fluid tank 10*b* is attached to the application. The manual valve cap 37 is also removed when the user operates the manual valve.

In this variant, the pressure vessel 12 is protected by a metal pipe 42. Also in the present modification, when a fire occurs on the side of the attachment/detachment valve 31, heat can be transferred to the side of the safety valve 32 by the metal pipe 42, and the rupture of the pressure vessel 12 can be suppressed by operating the safety valve 32. In the present modification, the protective cap 35 is used to protect the attachment/detachment valve 31. For example, when the fluid tank 10*b* is transported, the protective cap 35 is attached to the metal dome 13*a* to prevent foreign matter from entering the attachment/detachment valve 31.

Figure 12:
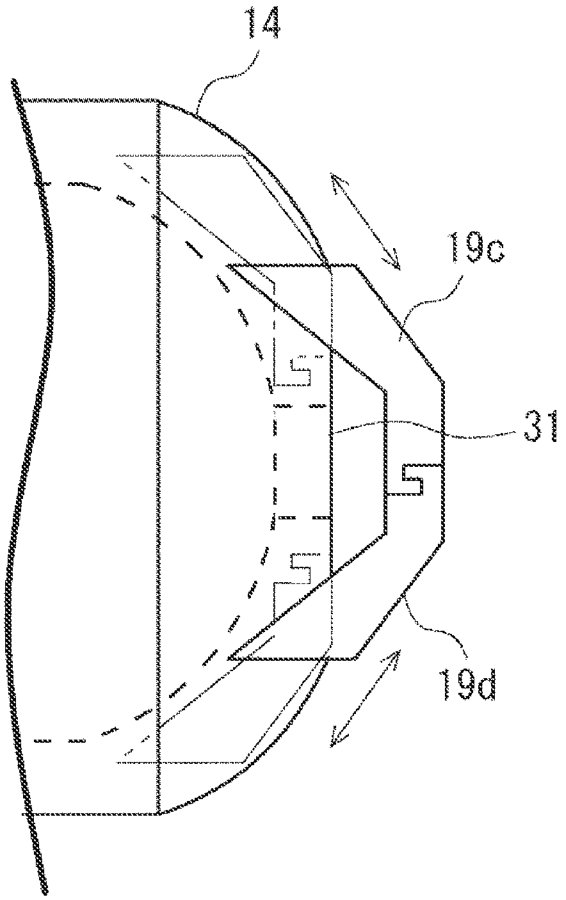
FIG. 12 is a side view illustrating another configuration example of the handle portion.

In the above embodiment, an example has been described in which the handle 19 is rotatably attached to the metal dome 14 via the hinge bracket 20. However, the present disclosure is not limited thereto. FIG. 12 is a side view illustrating another configuration example of the handle portion. In this case, the handle 19 is divided into two handle portions 19*c* and 19*d*. The handle portion 19*c* and 19*d* are mounted so as to be slidable obliquely with respect to the metal dome 14. When not in use, the handle portion 19*c* and 19*d* are stored in the peripheral portion, respectively, avoiding the central portion of the metal dome 14 in which the safety valve 32 is housed. The handle portion 19*c* and 19*d* are each hooked. The hooks are caught and secured to each other as the handle portion 19*c* and 19*d* move back to the retracted position. Even in the case of using a handle having such a split structure, the size in the tank longitudinal direction can be made compact by avoiding the safety valve 32 when not in use.

While the embodiments of the present disclosure have been described in detail above, the present disclosure is not limited to the above-described embodiments, and changes and modifications to the above-described embodiments without departing from the spirit of the present disclosure are also included in the present disclosure.

What is claimed is:

1. A fluid tank comprising:

a pressure vessel in which a fluid is contained;

a first dome protector and a second dome protector disposed facing each other across the pressure vessel in a longitudinal direction of the pressure vessel;

a connecting member that connects the first dome protector and the second dome protector along an exterior of the pressure vessel; and a bolt that attaches the connecting member to the first dome protector or the second dome protector, wherein:

an elongated hole in which a diameter in a longitudinal direction of the pressure vessel is longer than a diameter in a direction perpendicular to the longitudinal direction is provided in the connecting member;

the diameter of the elongated hole in the longitudinal direction is longer than an outer diameter of a shaft of the bolt;

the first dome protector or the second dome protector is slidably attached to the connecting member within a range of the diameter of the elongated hole in the longitudinal direction by the bolt inserted into the elongated hole.

2. The fluid tank according to claim 1, further comprising a handle that is attached to the first dome protector, wherein the handle is divided into a plurality of handle portions, and wherein when the handle is not in use, the handle portions are retracted along a side surface of the first dome protector.

3. The fluid tank according to claim 1, further comprising an exterior protector that is disposed on an exterior of the connecting member and that at least partially covers the pressure vessel between the first dome protector and the second dome protector.

4. The fluid tank according to claim 1, wherein the connecting member includes a plurality of plate-shaped stays.

5. The fluid tank according to claim 1, wherein the connecting member includes a cylindrical member that at least partially covers the pressure vessel.

6. The fluid tank according to claim 4, wherein:

the plurality of plate-shaped stays includes a first stay and a second stay; and the elongated hole is provided in the first stay.

7. The fluid tank according to claim 5, wherein the elongated hole is provided in a part of the cylindrical member that is connected to the first dome protector or the second dome protector.

8. The fluid tank according to claim 2, wherein each of the handle portions are connected to the first dome protector via a hinge bracket.

9. The fluid tank according to claim 2, wherein each of the handle portions is receivable along a protrusion of the first dome protector when stored.

* * * * *